Patented June 2, 1942

2,285,100

UNITED STATES PATENT OFFICE 2,285,100

PROCESS FOR REFINING MONTAN WAX

Kurt Stickdorn, Dessau-Rosslau/Anhalt, Germany, assignor, by mesne assignments, to "Unichem" Chemikalien Handels A.-G., Zurich, Switzerland, a corporation of Switzerland No Drawing. Application June 3, 1939, Serial No. 277,301. In Germany June 4, 1938

11 Claims. (Cl. 260—424)

This invention relates to a process for refining crude montan wax.

Many methods have heretofore been proposed for the purification of raw montan wax. These processes have involved treatments with solvents, or with acid agents, or with bleaching agents, or with various combinations of such treatments. These prior processes, however, have not proven completely satisfactory, for they have been somewhat insufficient for the accomplishment of complete purification, and, furthermore, the purification processes have for the most part been relatively difficult of execution, technically unsuitable and costly.

In accordance with the present invention, the montan wax is purified and refined by treating the same at a raised temperature with a sulfuric acid purifying agent in a quantity amounting to at least one-quarter of the weight of the wax treated, and separating the wax from the impurities present. The present process, therefore, involves the use of simple, well known agents, and is carried out in an easily workable manner.

More specifically the invention involves the refining of montan wax by melting the same at temperatures between 100° and 150° C., adding thereto sulfuric acid in concentrated form in an amount constituting from one-quarter to four times the weight of the wax employed, and vigorously stirring the mass at temperatures above 100° C., preferably at temperatures between 130 and 150° C., until the desired degree of purification is complete, which usually occurs in from four to eight hours. Thereafter the treated montan wax is separated from the impurities present in any number of ways, some of which are hereinafter described.

The sulfuric acid purifying agent employed in the oxidation process may be concentrated sulfuric acid, its monohydrate, fuming sulfuric acid having any sulfur trioxide content, or products which react in a manner similar to sulfuric acid, for instance, chlorsulfonic acid and acid compounds containing hexavalent sulfur, such as alkali metal bisulfates and the like.

During the treatment with the sulfuric acid purifying agent, wherein the impurities contained in the montan wax are in part converted, foam develops and the montan wax is transformed into a paste-like material. Upon completion of the reaction the resulting mass is preferably mixed with water and subsequently washed with additional water until the mass becomes neutral, it being permissible to add a small quantity of alkali to assist in the neutralization.

The washed and neutralized wax is then dried and may be further purified by extraction with any one or a mixture of organic solvents of the nature of benzol, toluol, tetrahydro naphthalene, decahydronaphthalene, heavy benzine or the like. A light yellow colored wax may be obtained from this solution by distilling off the solvent or by precipitation, either through the use of a chilling operation or by the addition of suitable solvents.

In accordance with a specific embodiment of the present invention, the acid purification is supplemented by a treatment with a caustic alkali at a temperature at which the wax is in a molten condition, the said treatment being continued until the alcoholic content of the wax is converted into the corresponding acids. This supplemental treatment may be effected either before or after the acid treatment.

The nature of the present invention is made clear in the following examples wherein all parts are given by weight.

Example 1

Three hundred parts of concentrated sulfuric acid are slowly introduced into 100 parts of melted montan wax at a temperature of 120° C. Thereupon the temperature is raised to 150° C. for a period of about eight hours. At this point a crumbly mass is obtained, which mass is then washed with water until it is neutralized. The mass is then dried, mixed with decahydronaphthalene or heavy benzine and brought to a boil. Thereafter the wax is filtered from the coal-like pulverulent residue and subjected to distillation in vacuo for the removal of the solvent. As the final mass one obtains a light yellow montan wax having an acid number of 120 and a melting point of 80° C.

Example 2

One hundred parts of raw montan wax are heated in an autoclave with 17 parts of caustic soda and stirred for a period of several hours at a temperature of 290° C. during which heating the hydrogen and water vapor evolved are continuously blown off. The hard dry mass obtained by this treatment is then further treated at a temperature of 125° C. by slowly adding 100 parts of concentrated sulfuric acid, after which the mixture is heated to a temperature of 150° C. for a period of about five hours and at a temperature of 180° C. for a period of three hours. Thereafter the mass obtained is treated with the procedure described in Example 1. From this process more than 65 parts of a yellow montan wax having an acid number of 128 and a melting point of 81° C. is obtained.

The yellow colored wax products obtained by the present process may be used as such or in the form of their esterification-, etherification-, and like products. In the known fields employing wax, the purified wax, for example, may be used in the manufacture of surface polishing agents, for impregnating wood, fibers, textiles and the like, in the production of insecticides, as raw material for the manufacture of saponaceous products, and as agents for imparting water repellance, and the like.

It should be understood that the herein described purification processes may be used in common with other known purification or refining processes and that the instant invention is not limited by the specific procedures herein described. The scope of the invention is indicated by the claims appended hereto.

I claim:

1. A process for refining crude montan wax without reliance upon bleaching agents which comprises treating a mass consisting essentially only of such wax at an elevated temperature between about 100° to 150° C. with a sulfuric acid purifying agent in a quantity amounting to at least one-quarter of the weight of the montan wax treated and, after action of the agent is complete, separating the montan wax from the impurities present.

2. A process for refining crude montan wax which comprises subjecting a mass consisting essentially only of such wax to the action of concentrated sulfuric acid at a temperature above the melting point of the wax mass treated between about 100° to 150° C., such acid being used in a quantity amounting to at least one-quarter of the weight of the wax material treated and, after the action of the acid is complete, separating the montan wax from the impurities present.

3. A process for refining montan wax which comprises subjecting a mass consisting essentially only of crude montan wax at a temperature of from 100 to 150° C. to the action of sulfuric acid in highly concentrated form and in a quantity amounting to one-quarter to four times the weight of the wax treated, continuously stirring the resulting mixture at a temperature over about 100° C. until the purification action is complete, and separating the impurities from the refined wax by treatment with a solvent.

4. A process for the refining of crude montan wax comprising subjecting montan wax at a raised temperature to the action of a sulfuric acid purifying agent in a quantity amounting to at least one-quarter of the weight of the montan wax treated until the purification action is complete, separating the montan wax from the impurities present, and supplementing such acid treatment by a treatment comprising subjecting the montan wax to the action of an alkali at a temperature above the melting point of the wax.

5. A process for refining crude montan wax which comprises subjecting montan wax at a temperature in excess of 100° C. with sulfuric acid in concentrated form in a quantity amounting to from one-quarter to four times the weight of the montan wax treated for a period in excess of about four hours, separating the impurities present from the montan wax, and supplementing said treatment by a step involving subjecting the wax to the action of caustic alkali at a temperature above the melting point of the wax.

6. A process for refining crude montan wax which comprises mixing the montan wax with caustic alkali for several hours at a temperature above the melting point of the wax, during which period gaseous products are removed, and thereafter subjecting the wax obtained to the action of a sulfuric acid purifying agent in a quantity amounting to at least one-quarter of the weight of the montan wax treated, said treatment being maintained at a temperature above 100° C. and continued until the purification action is complete, and then separating the montan wax from the impurities present.

7. The process which comprises heating a mass consisting essentially only of crude montan wax to a temperature at which the same becomes molten between about 100° to 150° C., subjecting the resulting melted wax to an acid purification treatment consisting of contacting the same with concentrated sulfuric acid, the proportion of said acid used amounting to at least one-quarter of the weight of the crude wax, and after the action of the acid is completed, separating the purified wax from the impurities present.

8. The process which comprises subjecting a mass consisting essentially only of crude montan wax in melted form at a temperature of about 100° to 150° C. to the action of concentrated sulfuric acid in a proportion amounting to at least about an equal amount by weight of the crude wax until the acid purification is completed, and separating the purified wax from free acid and other impurities present.

9. The process which comprises subjecting crude montan wax in melted form to the action of concentrated sulfuric acid in a proportion amounting to at least one-quarter of the weight of the crude wax until the acid purification is completed, and extracting the treated wax from the impurities present by means of an organic solvent.

10. The process which comprises subjecting crude montan wax in melted form to the action of concentrated sulfuric acid in a proportion amounting to at least one-quarter of the weight of the crude wax until the acid purification is completed, removing the free acid present, mixing the treated wax with an organic solvent, separating the wax-solvent mixture from the solid impurities, and separating the solvent from the wax.

11. The process of refining crude montan wax which comprises subjecting the wax to a combination of acid and alkali treatments involving intimately contacting the wax in melted condition with a concentrated sulfuric acid purifying agent in a proportion amounting to at least one-quarter of the crude wax until the purifying action of said acid agent is completed, and also involving intimately contacting the wax with alkali at an elevated temperature and for a period which converts the alcoholic content to the corresponding acids, and finally separating the purified wax from the impurities present.

KURT STICKDORN.